Sept. 16, 1952 K. C. BUGG 2,610,379

FASTENER

Filed Dec. 6, 1944 5 Sheets-Sheet 1

INVENTOR.
Kenly C. Bugg.
BY
Wilkinson, Huxley, Byron & Knight
attys.

FASTENER

Filed Dec. 6, 1944

5 Sheets-Sheet 2

INVENTOR.
Kenly C. Bugg.
BY

Attys.

FASTENER

Filed Dec. 6, 1944

5 Sheets-Sheet 3

INVENTOR.
Kenly C. Bugg,

BY

Williamson, Hughes, Byron & Knight Attys.

Sept. 16, 1952 K. C. BUGG 2,610,379

FASTENER

Filed Dec. 6, 1944 5 Sheets-Sheet 4

INVENTOR.
Kenly C. Bugg,

BY

Atkinson, Huxley, Byron & Knight
Attys

Sept. 16, 1952 K. C. BUGG 2,610,379

FASTENER

Filed Dec. 6, 1944 5 Sheets-Sheet 5

INVENTOR.

Kenly C. Bugg.

BY

Wilkinson, Huxley, Byron & Knight

Attys.

Patented Sept. 16, 1952 2,610,379

UNITED STATES PATENT OFFICE 2,610,379

FASTENER

Kenly C. Bugg, Fort Wayne, Ind.

Application December 6, 1944, Serial No. 566,831

17 Claims. (Cl. 24—221)

This invention pertains to fasteners and more particularly to temporary or readily releasable fasteners which are settable from one side.

It is an object of this invention to provide a fastener which is a complete unitary assembly performing readily releasable locking functions without utilizing any means applied or attached to the articles to be fastened together.

Another object is to provide a locking fastener of unitary assembly readily usable for repair, or as original securing means wherein it is only necessary for its use that aligned apertures be provided in the articles to be secured.

Yet another object is to provide a locking fastener utilizing resilient means for facilitating application and removal but wherein no shear nor complete tension or compression is applied to said resilient means.

A further object is to provide a locking fastener of unitary assembly having locking means including resilient means for securing together plates and the like placed under vibrational and other loads.

Yet a further object is to provide a locking fastener of unitary assembly applicable and removable from one side of the parts to be secured and wherein little space is necessary on the side of the parts to be secured opposite to the side of application.

Still a further object is to provide a locking fastener of unitary assembly provided with means for readily indicating the relative position of the parts in their locking or unlocking conditions.

A different object is to provide a locking fastener of unitary assembly which is inexpensive to make and maintain and fulfills all conditions of manufacture and service, and wherein the locking and unlocking cycles may be performed indefinitely without undue wear on the fastener or the parts secured thereby.

Still a different object is to provide a locking fastener which itself accurately dowels the apertures of the parts secured thereby, and gives highest possible wear and tensile strength.

Yet a different object is to provide a locking fastener of unitary assembly wherein locking means is provided utilizing a resilient member but wherein means is provided for relieving the resilient member of all tension stress above a predetermined stress.

Another object of the invention is to provide a locking fastener wherein a locking part thereof is adapted to be positively arrested at released and locked positions.

Another object of the invention is to provide a cam fastener wherein the locking members may be concentric or eccentric with respect to the center of the holes of the objects secured by the fastener.

With these and various other objects in view, the invention may consist of certain novel features of construction and operation as will be more fully described and particularly pointed out n the specification, drawings and claims appended hereto.

In the drawings, which illustrate embodiments of the device and wherein like reference characters are used to designate like parts:

Figure 1:
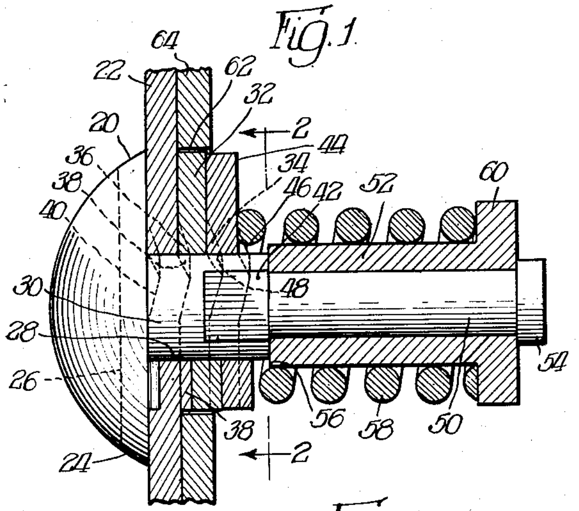
Figure 1 is an enlarged sectional elevation of one form of fastener embodying the invention showing the same in initial inoperative position with respect to articles to be secured together, which, in the embodiment shown, are plates.
Figure 2:
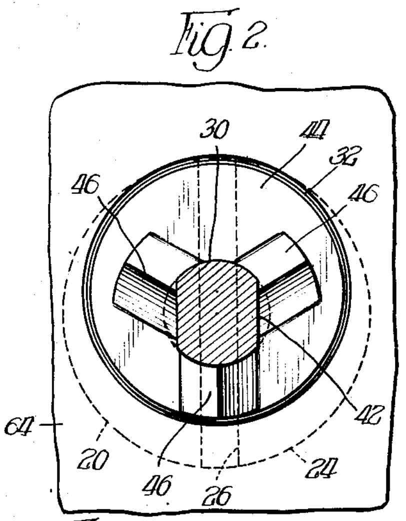
Figure 2 is a sectional plan view taken substantially in the plane indicated by the line 2—2 of Figure 1.
Figure 3:
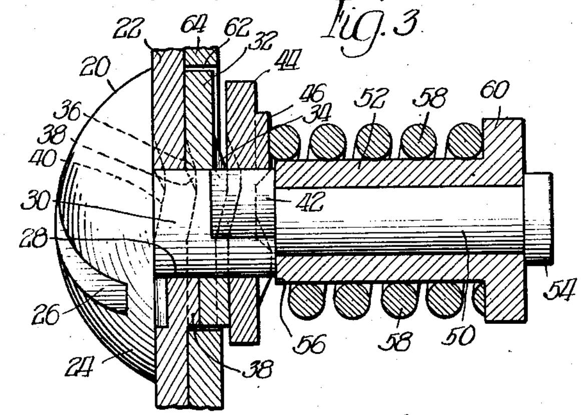
Figure 3 is an enlarged sectional elevation corresponding to Figure 1, showing the fastener during movement from inoperative postion to operative or securing position.
Figure 4:
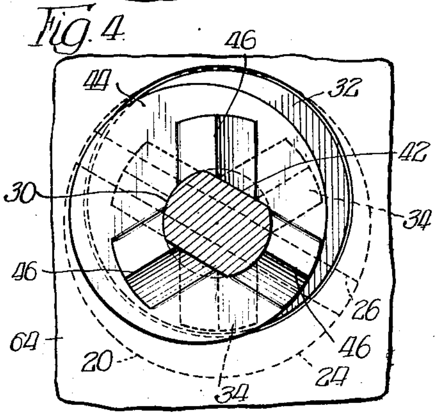
Figure 4 is a fragmentary sectional plan view corresponding to Figure 2, but showing the parts in the relative positions occupied in Figure 3.

This application is a continuation-in-part of application Serial No. 473,070, filed January 21, 1943, now abandoned.

Referring first of all more particularly to the fastener illustrated in Figures 1 to 6 inclusive, the fastener 20 is shown as rotatably secured to the plate 22. The fastener comprises the head 24 slotted as at 26 to accommodate a setting tool such as a screw driver bit. The plate 22 is provided with the aperture 28 through which the upper shank 30 of the fastener extends, the diameter of the upper shank closely approximating the diameter of the aperture 28. The filling or cam riser washer 32 is disposed on the shank 30 but is not secured against rotation with respect to said shank. Said washer 32 is provided with cam rises 34 formed by dimpling or recessing the washer as at 36. The plate 22 is provided with corresponding rises 38 formed by dimpling or recessing the plate as at 40, said rises 38 fitting within rises 34 preventing rotation of the washer 32. Thus the washer 32 is positioned with respect to the plate 22 and the recess 26 always has an initial position with respect to said plate. The cam rises are preferably three in number disposed 120° apart.

The shank 30 is provided with the squared portion 42 extending through a correspondingly squared aperture in a locking washer 44, said locking washer being of slightly less diameter than the washer 32 and being provided with cam rises 46 corresponding to the cam rises 34. The recesses 48 caused by forming said cam rises are adapted to receive the cam rises 34. The shank 30 is provided with the lower shank member 50 on which the sleeve or ferrule 52 is disposed. The sleeve 52 is riveted to the shank 50 as at 54 and is provided with the shoulder 56. The spring 58 is disposed between the locking washer 44 and the seat 60 disposed on the sleeve 52.

Figure 5:
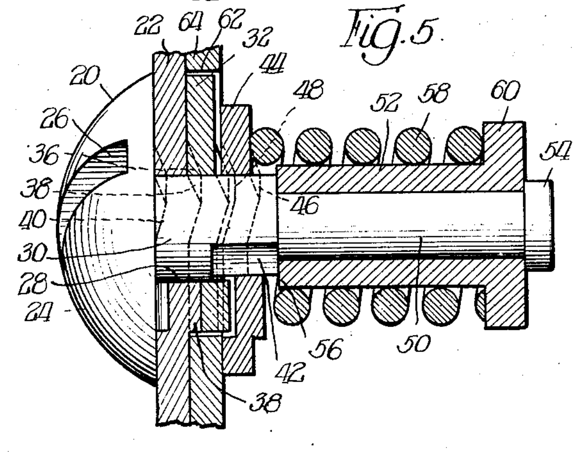
Figure 5 is an enlarged sectional elevation corresponding to Figure 1, showing the fastener in a fully locked position.
Figure 6:
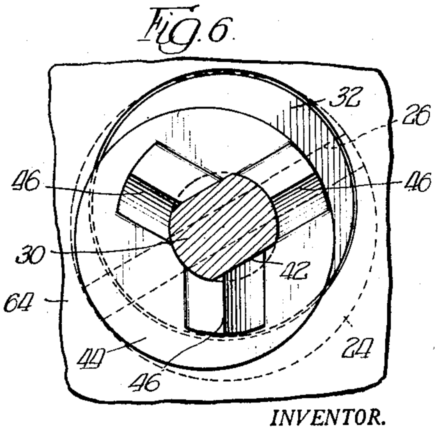
Figure 6 is a sectional plan view corresponding to Figure 2, but showing the parts in the relative positions occupied in Figure 5.

In applying this fastener it is of course to be understood that the aperture 62 of the plate 64 is of slightly larger diameter than the diameter of the filling washer 32 whereby the filling washer is received in the aperture. In applying this fastener the locking washer 44 is rotated by the head 24 to a position where it is concentric with the filling washer 32. The plate 64 may then be positioned so that the washer 32 is received in the opening 62. Rotation of the head 26 by a suitable tool such as a screw driver causes the locking washer 44 to raise, compressing the spring 58 due to the washer 44 riding up on the cam rises 34. Rotation of the head continues until the rises 34 of washer 32 are received in the subsequent recesses 48, at which time the locking washer 44 will have been moved to an eccentric position (Figure 5). Another movement to move the recesses to the succeeding cam rises still maintains the washer 44 in locking position. The next additional rotation of 120° again causes the locking washer 44 to assume a concentric position with respect to the washer 32, whereby the fastener is unlocked and the plates 64 and 22 may be separated.

It will be seen that the entire tension load need not be taken by the spring 58 because movement of the plate 64 with respect to the washer 32 will occur until the washer 44 contacts the shoulder 56, at which time the load is taken by the fastener, and this contact between the washer 44 and the shoulder 56 preferably takes place before the spring goes solid. The sheer load, of course, is taken on the fastener and at no time is taken on the spring.

Figure 7:
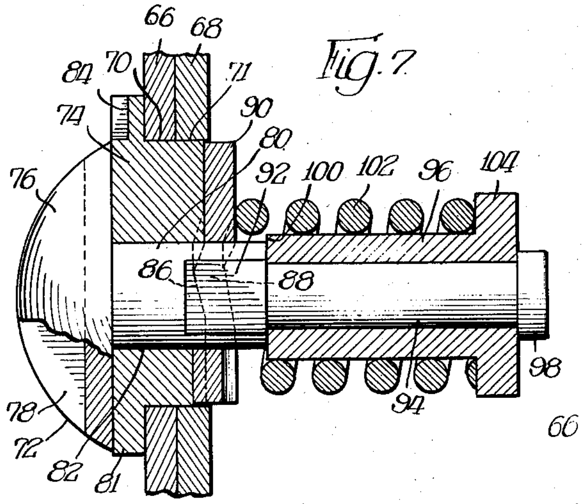
Figure 7 is an enlarged sectional elevation corresponding to Figure 1, showing a modified form of fastener embodying the invention.
Figure 8:
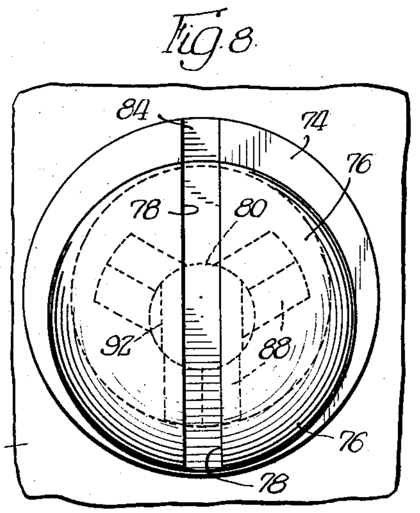
Figure 8 is an enlarged plan view of the fastener illustrated in Figure 7, the same looking toward the right as viewed in said figure.
Figures 9, 10, 11, 12:
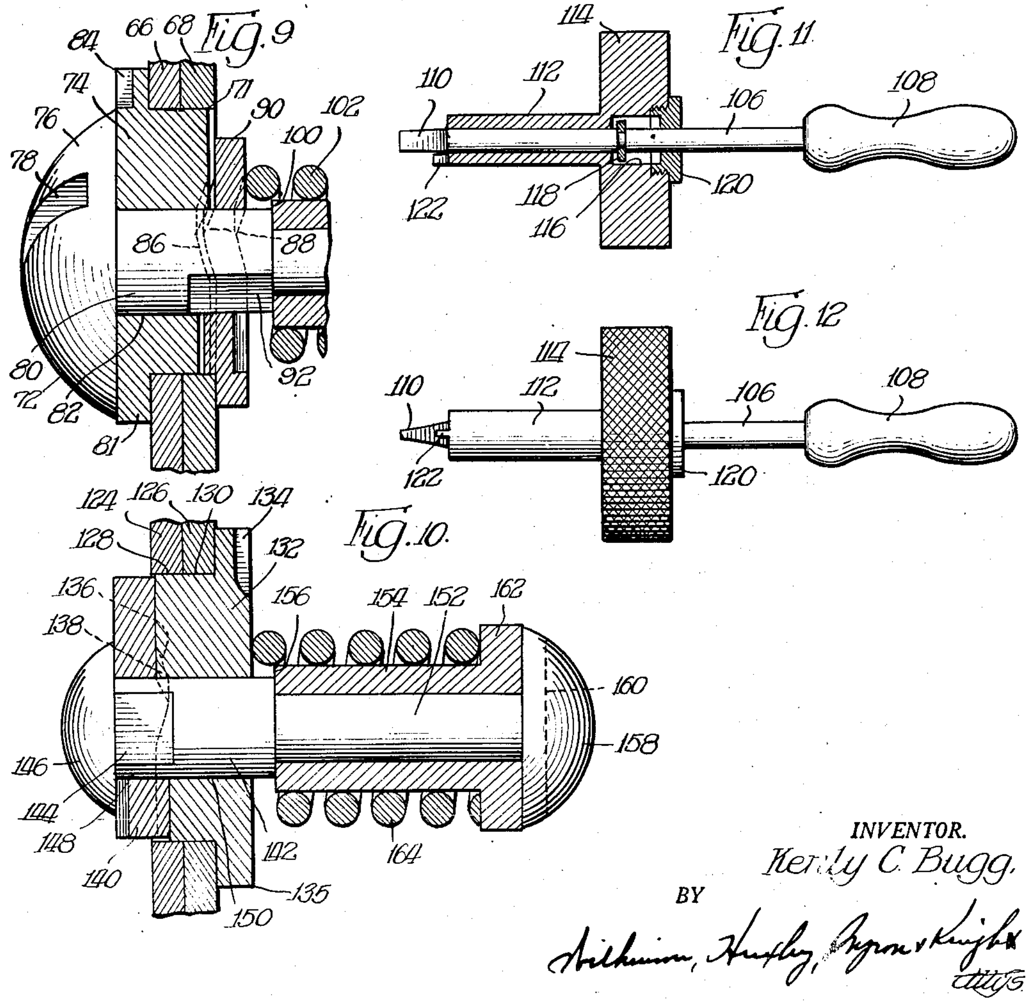
Figure 9 is an enlarged fragmentary sectional elevation corresponding to Figure 7 showing the fastener in fully locked position.
Figure 10 is an enlarged sectional elevation corresponding to Figures 1 and 7 showing another modified form of fastener embodying the invention.
Figure 11 is an elevation, partly in section, of a tool for setting the fastener illustrated in Figures 7, 8 and 9.
Figure 12 is a side elevation of the setting tool illustrated in Figure 11, but taken at 90° to Figure 11.

Referring now to the modification illustrated in Figures 7, 8 and 9, a fastener independent of the articles to be secured is shown. In this case the articles to be secured comprise the plates 66 and 68 provided with the aligned apertures 70 and 71, in the instance shown said apertures being of the same diameter. The fastener 72 comprises the rotatable head 76 provided with the slot 78 for the reception of an operating tool. The head 76 is provided with the upper filling washer 74, said washer being provided with the eccentric aperture 82 through which the upper shank 80 of the fastener extends. The washer 74 is provided with a plate engaging rim 81 having tool receiving slot 84 which serves as a means for fixing the washer 74 during the time that the fastener is being secured, and also provides means by which a zero inoperative position can be established, and similarly provides holding means whereby the fastener may be readily released.

The washer 74 is provided with the recess 86 for the reception of the cam rise 88 provided on the locking washer 90. The locking washer 90 is non-rotatable with respect to the shank 80, being held in position thereon by the squared portion 92. The shank 80 is provided with the lower shank 94 of smaller diameter on which the sleeve 96 is disposed, said sleeve being riveted or otherwise secured to the shank 94 as at 98, said sleeve providing the shoulder 100. The spring 102 is disposed between the washer 90 and the spring seat 104 disposed on the sleeve 96. As before, there are preferably three cam rises and recesses 88 and 86 disposed equidistantly apart whereby when the fastener is in either of two fastened positions the slot 78 is not disposed in the same position as in the zero or unlocked position.

A tool for operating the fastener shown in Figures 7, 8 and 9 is shown in Figures 11 and 12, the tool comprising the shank 106 provided with the handle 108, the opposite end thereof being provided with the bit 110 for reception by the slot 78. The sleeve 112 is slidably and rotatably mounted on the shank 106, being provided with the knurled portion 114, or other convenient means for holding the sleeve 112. The sleeve 112 is recessed as at 116, and the shank 106 is provided with the fastener such as the washer 118 for limiting the relative linear movement between the shank 106 and sleeve 112. The closure 120 is provided on the sleeve 112 for preventing ingress of dirt or grit. The sleeve 112 is also provided with the bit 122, said bit being adapted to be received in the slot 84.

Thus, in order to apply the fastener shown in Figures 7, 8 and 9 to hold the plates 66 and 68 together, the fastener is first inserted into the apertures 70 and 71, it being understood of course that the washer 90 has been moved to a position concentric with the washer 74. The tool shown in Figures 11 and 12 is then applied to the fastener, the bit 110 being received in the slot 78 and the bit 122 being moved to be received in the slot 84. The sleeve 112 is held against rotation and the handle 108 is rotated to cause the cam rises 88 to lift from the recesses 86 to be moved to either of the two succeeding positions, in which positions the washer 90 will be moved eccentrically with respect to the washer 74, thereby locking the plates 66 and 68 together. As before, the tension load need not be taken by the spring because after initial movement of the plate 68 it will engage the shoulder 100 preferably before the spring goes solid, and as before, at no time is the sheer load taken by the spring.

In the modification illustrated in Figure 10, a form of device is provided wherein the fastener is adapted to be inserted from the right as viewed in said figure, this form of fastener being useful where there is very little room beyond the plate 124. Plates 124 and 126 are provided with aligned apertures 128 and 130 adapted to receive a portion of the filling washer 132 of the fastener, said filling washer being provided with the recess 134 on the rim 135, which overlaps the adjacent plate 126, the recess being for the reception of a suitable bit or other tool for holding the washer 132 while it is being fastened or released. The washer 132 is provided with the recess 136 for the reception of the cam rise 138 provided on the locking washer 140, the locking washer 140 being of slightly smaller diameter than the aperture filling body portion of washer 132.

The locking washer 140 is non-rotatably provided on the upper shank 142, a squared portion 144 being provided on said shank for preventing rotation of the washer 140, the head 146 being provided to prevent dissociation of the washer from the shank. The shank 142 passes through the eccentric apertures 148 and 150 provided in said washers 140 and 132, and the shank is provided with the lower shank 152 upon which the sleeve 154 is disposed, the sleeve being provided with the shoulder 156. The sleeve 154 is held by means of the head 158, said head being recessed or slotted at 160 for the reception of a bit or suitable tool for operating the fastener, and said sleeve 154 is provided with the spring seat 162. The spring 164 is provided between said seat and the washer 132.

In applying this fastener to secure plates 124 and 126, it is to be understood that the washers 140 and 132 are disposed in concentric relation. Said fastener is inserted through the apertures 128 and 130 and a suitable tool as above described is used, one bit entering the recess 134, and the other entering recess 160. In a tool for this fastener it is to be understood that the outer bit is movable beyond the inner bit, i. e., oppositely to that shown in Figures 11 and 12. Rotation of the head 158 causes rotation of the washer 140, whereupon the washer 140 is disposed eccentrically of washer 132, securing plates 124 and 126 together. As before, preferably three cam rises are provided, and corresponding recesses are provided whereby the locking washer may be moved to two locking positions from zero.

Referring now to the modification illustrated in Figures 13 to 19 inclusive, the plates 200 and 202 to be secured together, are provided with the aligned apertures 204 and 206, aperture 206 being provided with the cut out portion 208 for the reception of the projection 210 provided on the internal spanner washer 212. The washer 212 otherwise fits the aperture 206 and is provided with the lug 214 extending toward the right as viewed in Figure 13, the lug being adapted to be received in the notch 216 provided in the cam riser washer 218.

Figure 25:
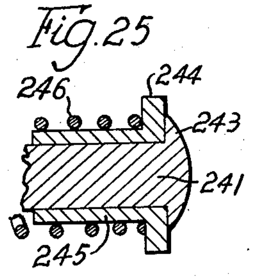

The cam riser washer is provided with the equally spaced cams or risers 220, shown three in number, which have cooperative relation with complementary cam risers 222 provided on the locking washer 224. The bolt 226 is provided with the stem 228, the stem having a cylindrical bearing portion 230 extending through cylindrical eccentric apertures 232 and 234 of the spanner washer and riser washer, the cylindrical portion being provided with the flats 236 adapted to be received in a corresponding eccentric aperture 238 provided in the locking washer. The stem may also be provided with the threaded portion 240 to which is secured the ferrule 242, or in this as well as the other modifications a cylindrical shank 241 (Figure 25) instead of the threaded portion 240 may be provided and a permanent head 243 or other locking means used to secure the smooth bore ferrule 245 in place. The ferrules 242 and 245 are provided with the spring seat 244 on which one end of the spring 246 seats, the other end of said spring seating on the locking washer 222. The ferrule may be of slightly larger diameter than the diameter of the bearing portion 230 to provide a shoulder 247 engageable by the locking washer prior to the spring going solid where separation of plates 200 and 202 takes place after the fastener is locked.

In this form of construction the cam rise washer is provided with the locking lugs or ears 248 and 250 facing toward each other in a peripheral direction, and the locking washer is provided with the notched portion 252 in alignment with one of the cam risers, preferably one adjacent the largest part of the locking washer.

Figures 13, 14, 15, 16, 17, 18:
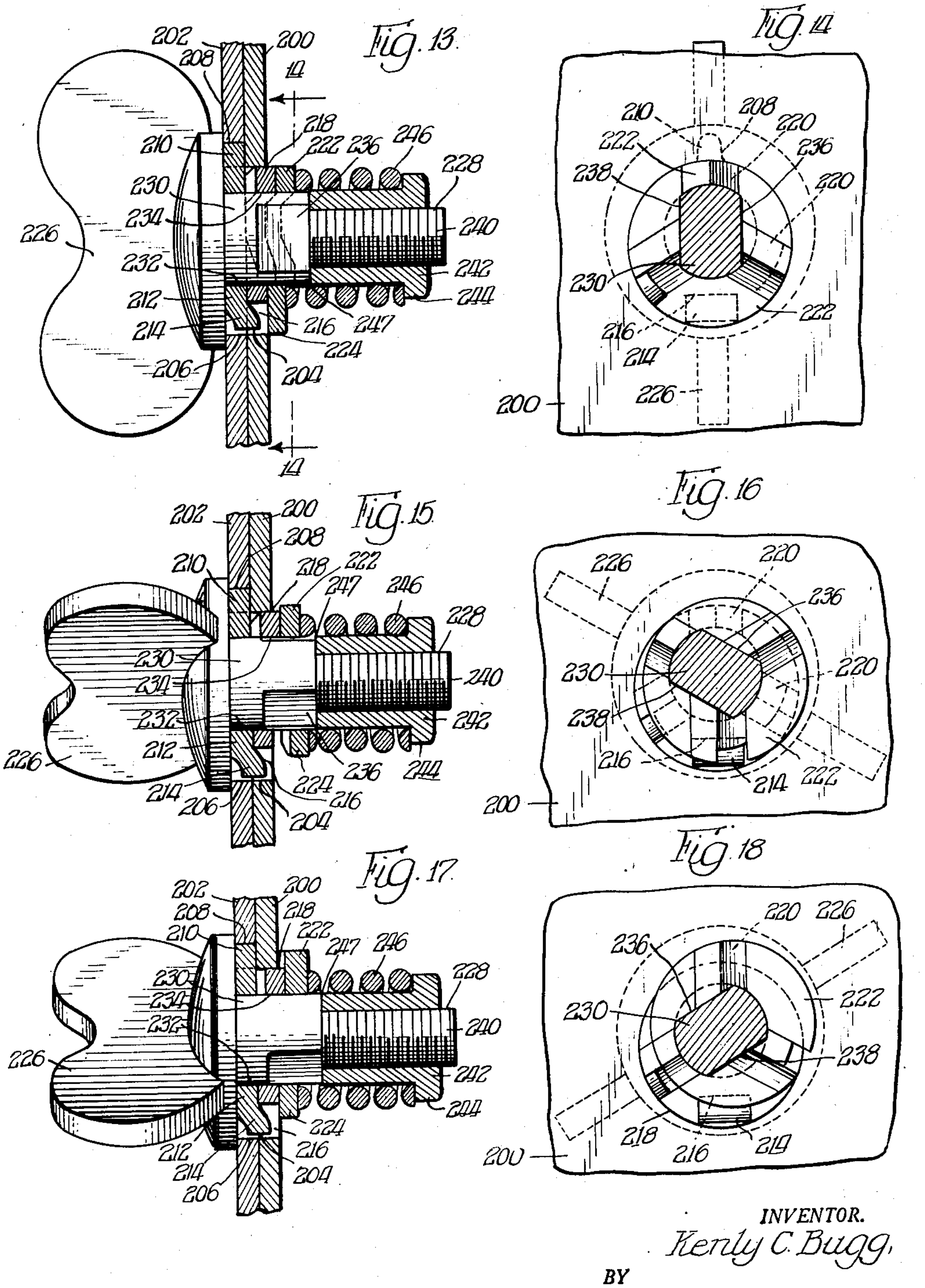
Figure 13 is an enlarged sectional elevation corresponding to Figure 1 showing another modified form of fastener embodying the invention, showing the same in initial inoperative position with the articles to be secured together.
Figure 14 is a sectional plan view taken substantially in the plane as indicated by the line 14—14 of Figure 13.
Figure 15 is a sectional elevation corresponding to Figure 13, showing the fastener during movement from the inoperative position illustrated in Figure 13 toward the fully operative or securing position.
Figure 16 is a sectional elevation corresponding to Figure 14, but showing the parts in the relative position occupied in Figure 15.
Figure 17 is an enlarged sectional elevation corresponding to Figure 13, but showing the parts in fully locked position.
Figure 18 is a sectional elevation corresponding to Figure 14, but showing the parts in the relative position occupied in Figure 17.
Figure 19:
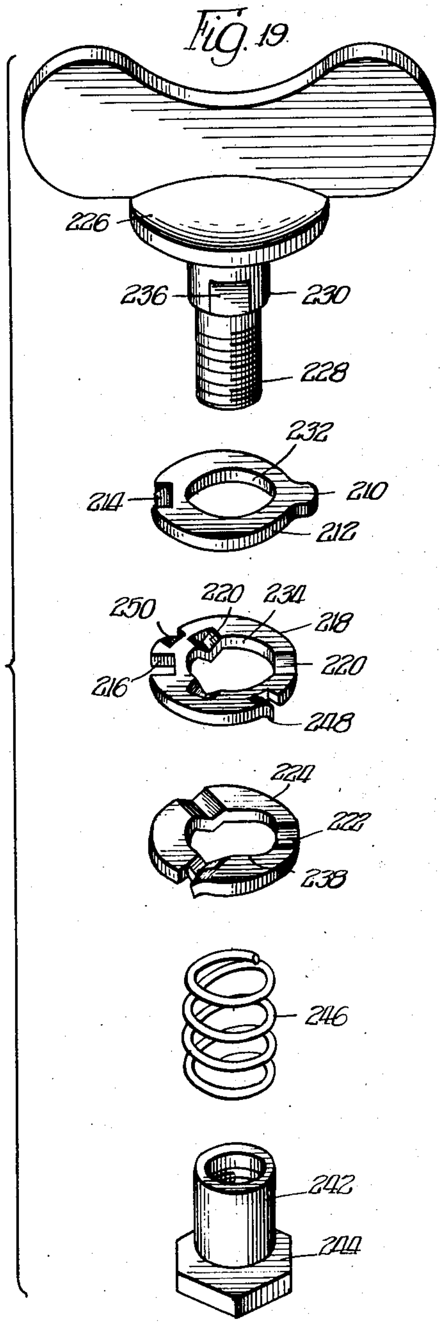
Figure 19 is an enlarged exploded view of the parts of the fastener illustrated in Figures 13 to 18 inclusive.
Figure 24:
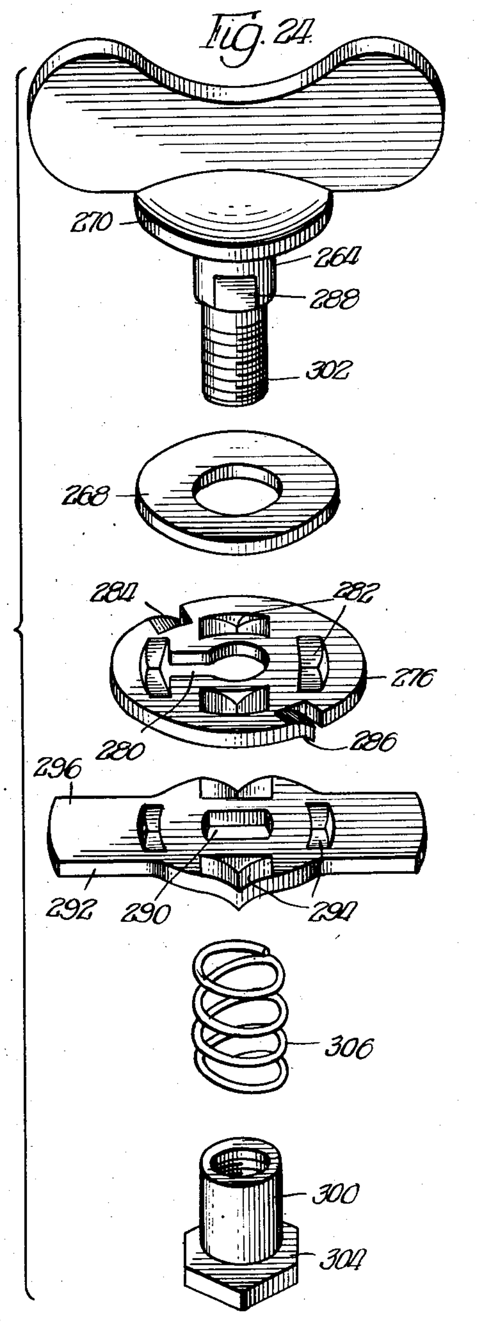
Figure 24 is an exploded elevation of the fastener illustrated in Figures 20 to 23 inclusive; and, Figure 25 is a fragmentary sectional elevation of a modified form of shank and ferrule used when a permanent fastening of the ferrule is desired.

Thus, assuming the fastener to be in inoperative position as shown in Figures 13 and 14, the cam riser washer and locking washer are concentric with the apertures 204 and 206. Upon rotation of the bolt, the locking washer will rotate with the bolt and the cam risers will cause the washer to be lifted out of the aperture 204 so that the washer rides to the position as shown in Figures 17 and 18, whereby the locking washer overlies the plate 200. When the locking washer has been moved to a position to engage the plate, the notch 252 will be moved to engage the shoulder 248, preventing any further rotation of the bolt so that the position of the bolt can be readily observed to ascertain whether or not it is in locked position. Reverse movement, of course, causes the notch to be moved to engage the other projection, where it is positively maintained in fully opened position.

In the construction illustrated in Figures 20 to 24 inclusive, a concentric form of fastener device is contemplated. In this form of device the plate 260 is provided with the aperture 262 through which the shank 264 of the bolt 266 extends, a washer 268 being interposed between the head 270 of the bolt and the plate.

The plate 272 to be secured to the plate 260 is likewise provided with an aperture 274 which is adapted to be aligned with the aperture 262 and the cam riser washer 276 is adapted to be fixed within the aperture 274 as the plate 260 is provided with the tongue 278 adapted to interlock with the washer 276 as at 280. The washer is provided with four equally spaced cam risers 282 and with opposite stops 284 and 286 facing in the same direction. The shank of the bolt is provided with the flats 288 adapted to be received within the correspondingly shaped aperture 290 of the locking washer 292.

The locking washer 292 is also provided with four complementary risers 294 adapted to be moved over the risers 282. The locking washer is provided with the spaced arms 296 adapted to fit through correspondingly shaped apertures 298 in the plate 272. The ferrule 300 is secured to the shank as at 302 and provides a spring seat 304 for one end of the spring 306, the other end of said spring seating on the locking washer. The ferrule may be of slightly larger diameter than the diameter of the bearing portion or shank 264, so that it forms a seat for the locking washer prior to the spring going solid, as before explained.

Figure 20:
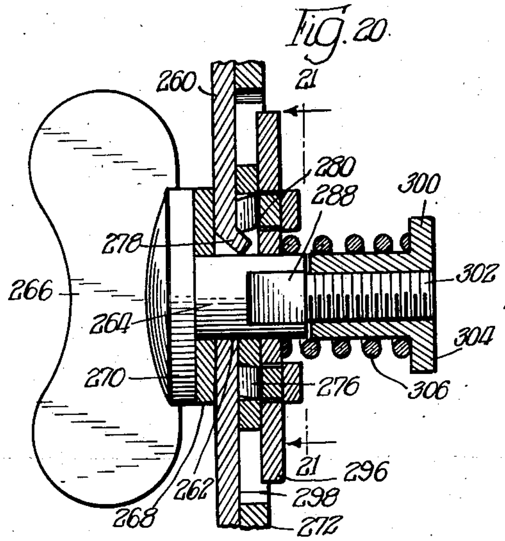
Figure 20 is an enlarged sectional elevation of another form of fastener embodying the invention showing the same in initial inoperative position with respect to the articles to be secured together.
Figure 21:
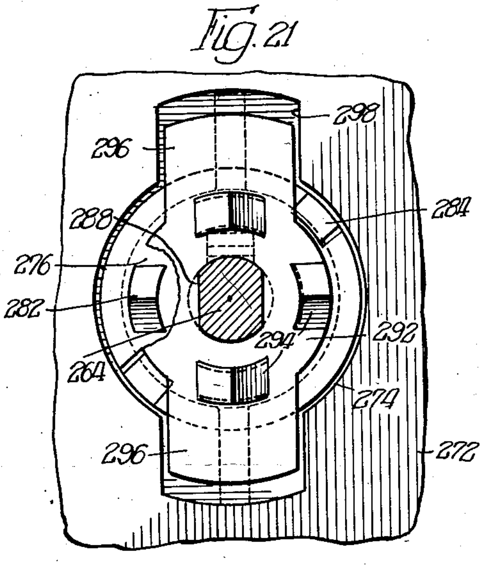
Figure 21 is a sectional elevation taken substantially in the plane as indicated by the line 21—21 of Figure 20.
Figure 22:
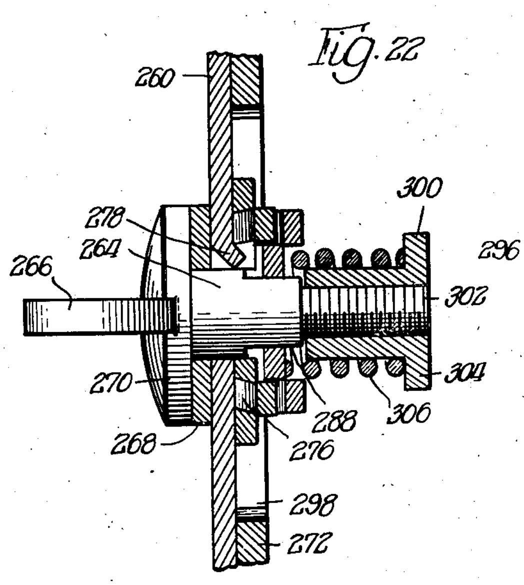
Figure 22 is a sectional elevation corresponding to Figure 20, but showing the fastener in locked position.
Figure 23:
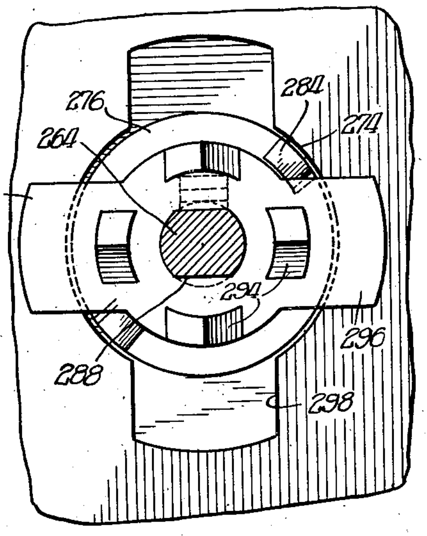
Figure 23 is a sectional elevation corresponding to Figure 21, but showing the fastener in locked position.

Thus when the washer is in inoperative position, such as that shown in Figures 20 and 21, the locking arms 296 extend in the correspondingly shaped openings 298, and in this position one of the risers 294 contacts the stop 286. Rotation of the bolt through 90° causes the riser 294 to move out of engagement with the stop 286, which causes the succeeding riser to move into engagement with the stop 284. In moving from one position to the other the arms 296 have been moved upwardly out of their recess 298 and into overlying engaging position with the plate 272 as shown in Figure 23.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In a fastener for securing plates together, the combination of a head having a shank, a member rotatable with said head and slidable with respect to said shank, a member adapted to be rotatably mounted on said shank between said head and first member, and resilient means for urging the first named member toward the second named member, said members having complementary engaging means for preventing accidental rotation of the first named member with respect to the second named member, said shank being provided with means for arresting movement of the first named member toward said resilient means prior to the time said resilient means goes solid.

2. In a fastener for securing plates together, the combination of a head having a shank, a member rotatable with said head and slidable with respect to said shank, a member adapted to be rotatably mounted on said shank between said head and first named member, one of said members being eccentric with respect to said shank, and resilient means for urging said first named member toward said second named member, said members having complementary engaging means for preventing accidental rotation of said first named member with respect to said second named member, said shank being provided with means for arresting movement of said first named member toward said resilient means prior to the time said resilient means goes solid.

3. In combination, a plate, a second plate to be secured to said first plate, said second plate having an aperture, a fastener having a head rotatably mounted on said first named plate, a shank rotatable with said head and extending through said first named plate and through the aperture in said second plate, a member non-rotatably disposed in said aperture, means between said first named plate and last named member for fixedly positioning said last named member in said aperture, a locking member rotatable with said shank and being adapted to be rotated to overlie said second plate, said locking member being eccentric with respect to said shank, said members having complementary engaging means for preventing accidental rotation of said first named member with respect to said second named member, and resilient means for urging said locking member toward said second plate, said shank being provided with means for arresting movement of said locking member toward said resilient means prior to the time said resilient means goes solid.

4. In a fastener for securing plates together, the plates having apertures adapted to be aligned, said fastener comprising a member having a head and a shank rotatable with said head, said head being larger than the apertures, a member rotatable on said shank and adapted to be inserted in said apertures, means between said last named member and one of said plates for preventing rotation of said last named member in said apertures, a locking member non-rotatably mounted on said shank and rotatable with said shank to engage one of the plates, said locking member being eccentric with respect to said shank, said second named member and locking member having complementary engaging means for preventing accidental rotation of said locking member with respect to said second named member, and resilient means for urging said locking member toward said head, said shank being provided with means for arresting movement of said second named member toward said resilient means prior to the time said resilient means goes solid.

5. In a fastener for securing plates together, the plates having apertures adapted to be aligned, said fastener comprising a member having a head and a shank rotatable with said head, said head being larger than said apertures, a member rotatable on said shank and adapted to be inserted in said apertures, means between said last named member and one of said plates for preventing rotation of said last named member in said apertures, a locking member non-rotatably mounted on said shank and rotatable to engage one of said plates, said second named member and locking member being eccentric with respect to said shank, said second named member and locking member having complementary engaging means for preventing accidental rotation of said locking member with respect to said second named member, and resilient means for urging said locking member toward said head, said shank being provided with means for arresting movement of said second member toward said resilient means prior to the time said resilient means goes solid.

6. In combination, a plate, a second plate to be secured to said first plate, said second plate having an aperture, a fastener having a head rotatably mounted on said first plate, a shank rotatable with said head and extending through said first plate and through the aperture in said second plate, a member non-rotatably disposed in said aperture, means between said first named plate and last named member for fixedly positioning said last named member in said aperture, a locking member rotatable with said shank and being adapted to be rotated to overlie said second plate, said members being eccentric with respect to said shank, said members having complementary engaging means for preventing accidental rotation of said first member with respect to said second member, and resilient means for urging said locking member toward said second plate, said shank being provided with means for arresting movement of said locking member toward said resilient means prior to the time said resilient means goes solid.

7. In a fastener for securing plates together, the combination of a head having a shank, a member rotatable with said head and slidable with respect to said shank, a member adapted to be rotatably mounted on said shank between said head and first named member, and resilient means for urging the first named member toward the second named member, said members having complementary engaging means for preventing accidental rotation of said first member with respect to said second member.

8. In a fastener for securing plates together, the combination of a head having a shank, a member rotatable with said head and slidable with respect to said shank, a member adapted to be rotatably mounted on said shank between said head and first named member, and resilient means for urging the first named member toward the second named member, said members having complementary engaging means for preventing accidental rotation of said first member with respect to said second member, the axis of rotation of said first named member coinciding with that of the shank, and said fastener being provided with means for limiting the rotation of said shank.

9. In a fastener for securing plates together, the combination of a head having a shank, a member rotatable with said head and slidable with respect to said shank, a member adapted to be rotatably mounted on said shank between said head and first named member, and resilient means for urging the first named member toward the second named member, said members having complementary engaging means for preventing accidental rotation of said first member with respect to said second member, said first named member being eccentric and said fastener being provided with means for limiting the rotation of said shank.

10. A fastener comprising a head having a shank, an eccentric locking member rotatable with said head and slidable on said shank, an eccentric cam rise member of substantially the same peripheral shape as that of the locking member, said cam rise member being journalled on said shank between said head and locking member, said members having complementary cooperating cam means, means for fixing the cam rise member while the shank is being rotated permitting the cam means to slide the locking member along the shank while the shank is rotating the locking member, resilient means for urging said first named member toward said second named member, and means on said locking member and another portion of the fastener for limiting rotation of said shank.

11. A fastener comprising a head having a shank, a member rotatable with the head and slidable on said shank, a member rotatable with respect to said shank, cam portions between said members so constructed and arranged that when said members are moved relatively to each other the first named member rotates with and slides along said shank, resilient means for urging said first named member toward said second named member, and means for rendering said second named member stationary while said shank is being rotated.

12. A fastener comprising a head having a shank, a member rotatable with the head and slidable on said shank, a member rotatable with respect to said shank, cam portions between said members so constructed and arranged that when said members are moved relatively to each other the first named member rotates with and slides along said shank, resilient means for urging said first named member toward said second named member, means for rendering said second named member stationary while said shank is being rotated, and means for limiting the rotation of said shank.

13. A fastener comprising a head having a shank, a locking member rotatable with said head and slidable on said shank, a cam rise member journalled on said shank between said head and locking member, said members having complementary cooperating cam means, means for fixing the cam rise member while the shank is being rotated permitting the cam means to slide the locking member along the shank while the shank is rotating the locking member, resilient means for urging said first named member toward said second named member, and means on said locking member and another portion of the fastener for limiting rotation of said shank.

14. A fastener comprising a head having a shank, a locking member rotatable with said head and slidable on said shank, said locking member having spaced locking arms, and being so disposed that the axis of rotation of said locking member coincides with that of the shank, a cam rise member journalled on said shank between said head and locking member, said members having complementary cooperating cam means, means for fixing the cam rise member while the shank is being rotated permitting the cam means to slide the locking member along the shank while the shank is rotating the locking member, resilient means for urging said first named member toward said second named member, and means on said locking member and another portion of the fastener for limiting rotation of said shank.

15. A fastener comprising a head having a shank, a locking member rotatable with said head and slidable on said shank, said locking member having spaced locking arms, and being so disposed that the axis of rotation of said locking member coincides with that of the shank, a cam rise member journalled on said shank between said head and locking member, said members having complementary cooperating cam means, means for fixing the cam rise member while the shank is being rotated permitting the cam means to slide the locking member along the shank while the shank is rotating the locking member, and resilient means for urging said first named member toward said second named member.

16. A fastener comprising a head having a shank, an eccentric locking member rotatable with said shank and slidable on said shank, a washer member having a portion adjacent the locking member of substantially the same peripheral shape as said locking member journalled on said shank, said members having complementary cooperating cam means so arranged that when said locking member is rotated with respect to said washer member said locking member slides on said shank, resilient means for urging said first named member toward said second named member, said washer member having a rim of a peripheral size different from that of the aforesaid washer member portion, and means for maintaining said washer member stationary while said head is being rotated.

17. A fastener comprising a head having a shank, an eccentric locking member rotatable with said shank and slidable on said shank, a washer member having a portion adjacent the locking member of substantially the same peripheral shape as said locking member journalled on said shank, said members having complementary cooperating cam means so arranged that when said locking member is rotated with respect to said washer member said locking member slides on said shank, resilient means for urging said first named member toward said second named member, said washer member having a rim of a larger peripheral size from that of the aforesaid washer member portion, and means on said rim for maintaining said washer member stationary while said head is being rotated.

KENLY C. BUGG.

REFERENCES CITED

The following references are of record in the file of this patent:

UNITED STATES PATENTS

| Number | Name | Date |
|---|---|---|
| 167,853 | Morand | Sept. 21, 1875 |
| 1,986,329 | Dzus | Jan. 1, 1935 |
| 2,323,260 | Venditty | June 29, 1943 |
| 2,403,247 | Sullivan | July 2, 1946 |

FOREIGN PATENTS

| Number | Country | Date |
|---|---|---|
| 432,937 | France | Dec. 20, 1911 |
| 462,482 | Great Britain | of 1937 |
| 542,028 | Great Britain | of 1941 |
| 875,520 | France | of 1942 |